United States Patent
Weisenberger et al.

(10) Patent No.: US 9,533,883 B2
(45) Date of Patent: Jan. 3, 2017

(54) APPARATUS AND METHOD FOR HARVESTING CARBON NANOTUBE ARRAYS

(75) Inventors: Mathew C. Weisenberger, Georgetown, KY (US); John D. Craddock, Lexington, KY (US)

(73) Assignee: UNIVERSITY OF KENTUCKY RESEARCH FOUNDATION, Lexington, KY (US)

( * ) Notice: Subject to any disclaimer, the term of this patent is extended or adjusted under 35 U.S.C. 154(b) by 1346 days.

(21) Appl. No.: 13/044,939

(22) Filed: Mar. 10, 2011

(65) Prior Publication Data

US 2012/0231259 A1    Sep. 13, 2012

(51) Int. Cl.
*B32B 9/00* (2006.01)
*B82Y 40/00* (2011.01)
*C01B 31/02* (2006.01)
*B01J 2/24* (2006.01)
*B01J 2/26* (2006.01)

(52) U.S. Cl.
CPC ........ *B82Y 40/00* (2013.01); *B01J 2/24* (2013.01); *B01J 2/26* (2013.01); *C01B 31/022* (2013.01); *Y10T 428/25* (2015.01); *Y10T 428/30* (2015.01)

(58) Field of Classification Search
CPC .. C01B 31/022; C01B 31/293; C01B 2202/00; Y10T 428/30; Y10S 977/742
USPC ................. 428/408; 423/447.1; 977/742
See application file for complete search history.

(56) References Cited

U.S. PATENT DOCUMENTS

| | | | |
|---|---|---|---|
| 7,160,531 B1 | 1/2007 | Jacques et al. | |
| 7,407,901 B2 | 8/2008 | Bystricky et al. | |
| 7,504,078 B1 | 3/2009 | Jacques et al. | |
| 2006/0166003 A1 | 7/2006 | Khabashesku et al. | |
| 2008/0018012 A1* | 1/2008 | Lemaire et al. | 264/82 |
| 2008/0075954 A1 | 3/2008 | Wardle | |
| 2009/0280324 A1 | 11/2009 | Liang et al. | |
| 2009/0311166 A1 | 12/2009 | Hart et al. | |

* cited by examiner

*Primary Examiner* — Daniel H Miller
(74) *Attorney, Agent, or Firm* — King & Schickli, PLLC

(57) ABSTRACT

An apparatus is provided for harvesting a carbon nanotube array from a substrate. The apparatus includes a peeler that peels the carbon nanotube array from the substrate and a support that receives the carbon nanotube array peeled from the substrate. In addition the apparatus includes a drawing device that simultaneously draws the carbon nanotube array from the substrate onto the support as the carbon nanotube array is peeled from the substrate. The peeler and drawing device are synchronized in operation so that as a given length of carbon nanotube array is peeled from the substrate, that same given length of carbon nanotube array is drawn onto the support.

16 Claims, 5 Drawing Sheets

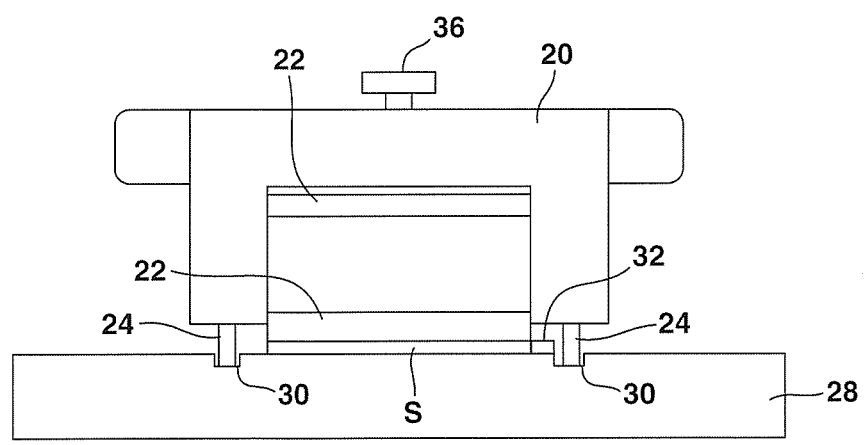
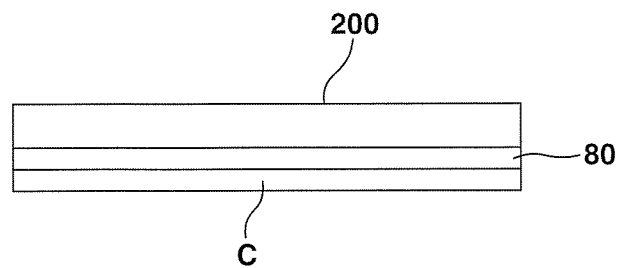

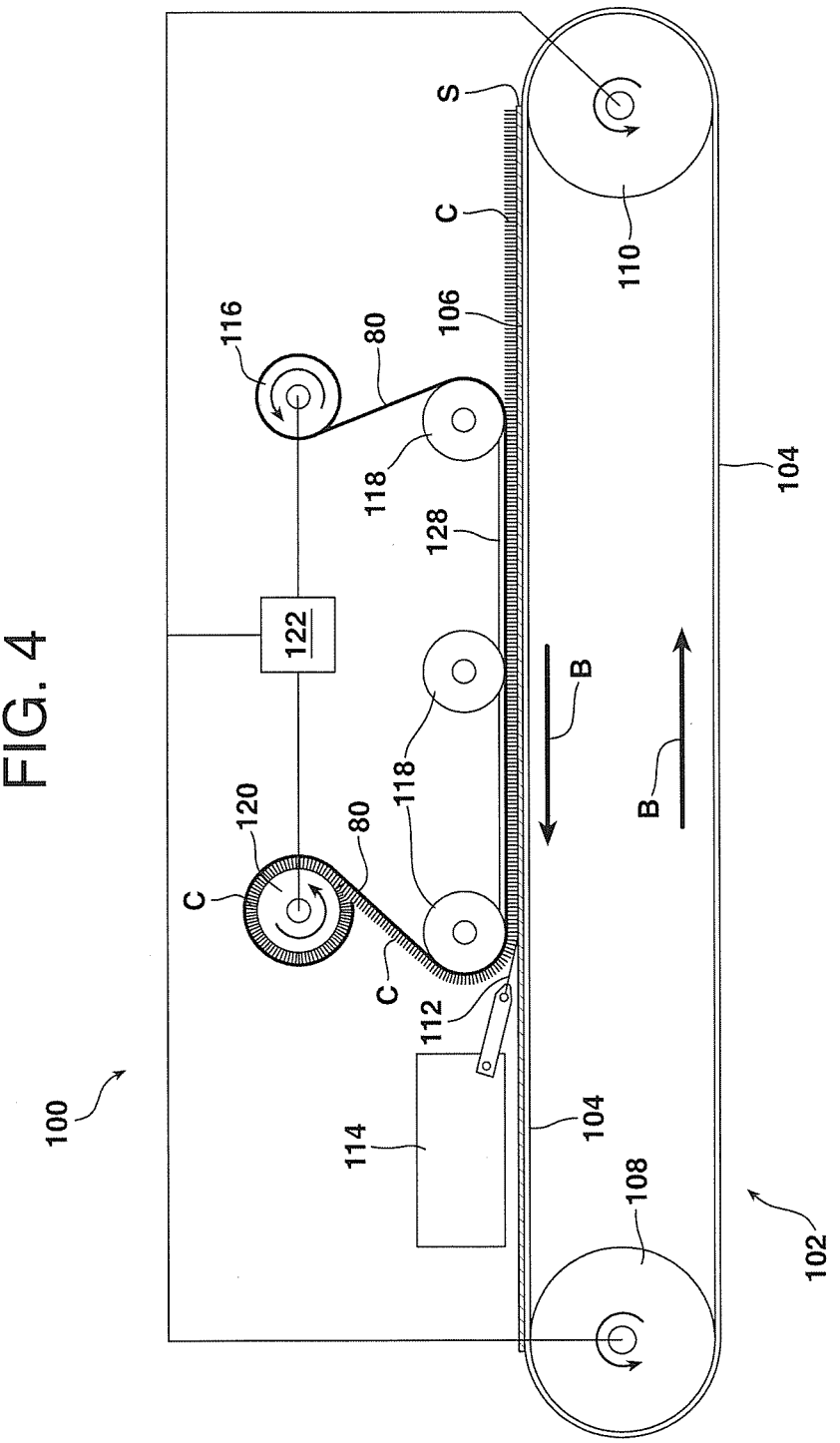

APPARATUS AND METHOD FOR HARVESTING CARBON NANOTUBE ARRAYS

This invention was made with at least partial support under U.S. Army contract no. W31P4Q-08-C-0189. The government may have certain rights in this invention.

TECHNICAL FIELD AND INDUSTRIAL APPLICABILITY OF THE INVENTION

The present invention relates generally to apparati and methods for harvesting carbon nanotube arrays from a substrate.

BACKGROUND OF THE INVENTION

U.S. Pat. Nos. 7,160,531 and 7,504,078 both to Jacques et al disclose methods and apparati for the continuous production of aligned carbon nanotubes. Specifically, the aligned carbon nanotubes are produced in arrays comprising a "wheat field" of multi-walled carbon nanotubes (MWCNTs) grown aligned normal to the underlying substrate. In the past the multi-walled carbon nanotubes have been harvested from the substrate for subsequent use in processing with hand-held razors positioned at various acute angles to the substrate. Unfortunately, normally, tight scrolling (inner rolling diameters of less than 2-3 mm) of the array occurs during such a procedure and only small pieces (less than 1 inch squared) are typically recoverable.

The present invention relates to new methods and apparati for harvesting carbon nanotube arrays in a "non-scrolled", flat, intact condition. The resulting harvested carbon nanotube arrays include vertically aligned MWCNTs forming free-standing films—free from the underlying substrate—with the vertically aligned, "wheat field" morphology intact. Advantageously, the recovery of relatively large, intact carbon nanotube arrays (on the order of between about 100 and about 500 inches squared) provides for a number of advantages including, but not limited to: maintaining the through-thickness axial alignment of the MWCNTs within the array in a free-standing sheet form, un-bound to the original growth substrate; such sheets provide for preferential transport properties, including thermal conductivity, along the nanotube axes, or through the sheet thickness; such free-standing sheets have both upper and lower MWCNT tips exposed; such sheets are compliant and can conform to surface roughness within an interface application; the original MWCNT growth substrates can be re-used in MWCNT synthesis; free-standing sheets can be die-cut into predetermined shapes; such size arrays can be used in applications requiring >100 square inches of continuous array sheets.

SUMMARY OF THE INVENTION

In accordance with the purposes and advantages of the present invention as described herein, an apparatus is provided for harvesting a carbon nanotube array from a substrate. The apparatus comprises a peeler that peels the carbon nantobue array from the substrate, a support that receives the carbon nanotube array peeled from the substrate and a drawing device that simultaneously draws the carbon nanotube array from the substrate onto the support as the carbon nanotube array is peeled from the substrate. The peeler and the drawing device are synchronized in operation so that as a length $L_1$ of carbon nanotube array is peeled from said substrate a length $L_2$ of carbon nanotube array is drawn onto the support where $L_1=L_2$.

In one possible embodiment of the invention the peeler comprises a cutting sled having a body supported for movement on at least two rollers. The body holds a cutter or blade at an acute cutting angle of between about 5 and about 45 degrees and more particularly of between about 10 and about 30 degrees. The support includes a guide track comprising two parallel rails. The body of the support includes at least four rollers engaging the guide track and rolling along the parallel rails.

The drawing device includes a take-up reel and a draw line. The draw line has a first end and a second end. The first end is connected to the carbon nanotube array while the second end is connected to the take-up reel. A static film is provided overlying and clinging to the carbon nanotube array on the substrate and the first end of the draw line is connected to that static film. Connecting rods connect the cutting sled of the peeler to the support. This ensures synchronous operation so that as the carbon nanotube array is harvested from the substrate it is simultaneously and synchronously positioned on the support. This synchronicity of operation allows for the harvesting of larger, intact sections of carbon nanotube array.

A second embodiment of the carbon nanotube array harvesting apparatus of the present invention allows for continuous harvesting. In this embodiment, a continuous conveyor is provided. The continuous conveyor has a conveying surface. A carbon nanotube array substrate is supported on the conveying surface.

In the second embodiment a feeder is provided for feeding a static film from a static film supply roll so that the static film overlies and clings to the carbon nanotube array on the continuous conveyor. A motor drives the conveyor which conveys the supported substrate and attached carbon nanotube array toward the peeler so that the cutter or blade of the peeler peels the carbon nanotube array from the substrate. A support, in the form of a winding drum functions to wind the carbon nanotube array and static film as it is peeled from the substrate. One or more motors drive the winding drum, the conveyor and the film feeder synchronously so that they operate at the same linear speed. This synchronicity of operation allows relatively large sections of carbon nanotube array to be harvested intact in a manner not previously possible in the art.

In the following description there is shown and described several different embodiments of the invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated herein and forming a part of the specification, illustrate several aspects of the present invention and together with the description serve to explain certain principles of the invention. In the drawings:

FIG. 3 is a detailed end elevational view of the sled also showing the guide channels and jug;

FIG. 4 is a schematical illustration of a second embodiment of the harvesting apparatus; and FIG. 5 is an end elevational view of a carbon nanotube array supported on a flexible magnetic sheet so as to be adapted for ease of handling.

Reference will now be made in detail to the present preferred embodiment of the invention, examples of which are illustrated in the accompanying drawings.

DETAILED DESCRIPTION OF THE PREFERRED EMBODIMENTS OF THE INVENTION

Figure 1:
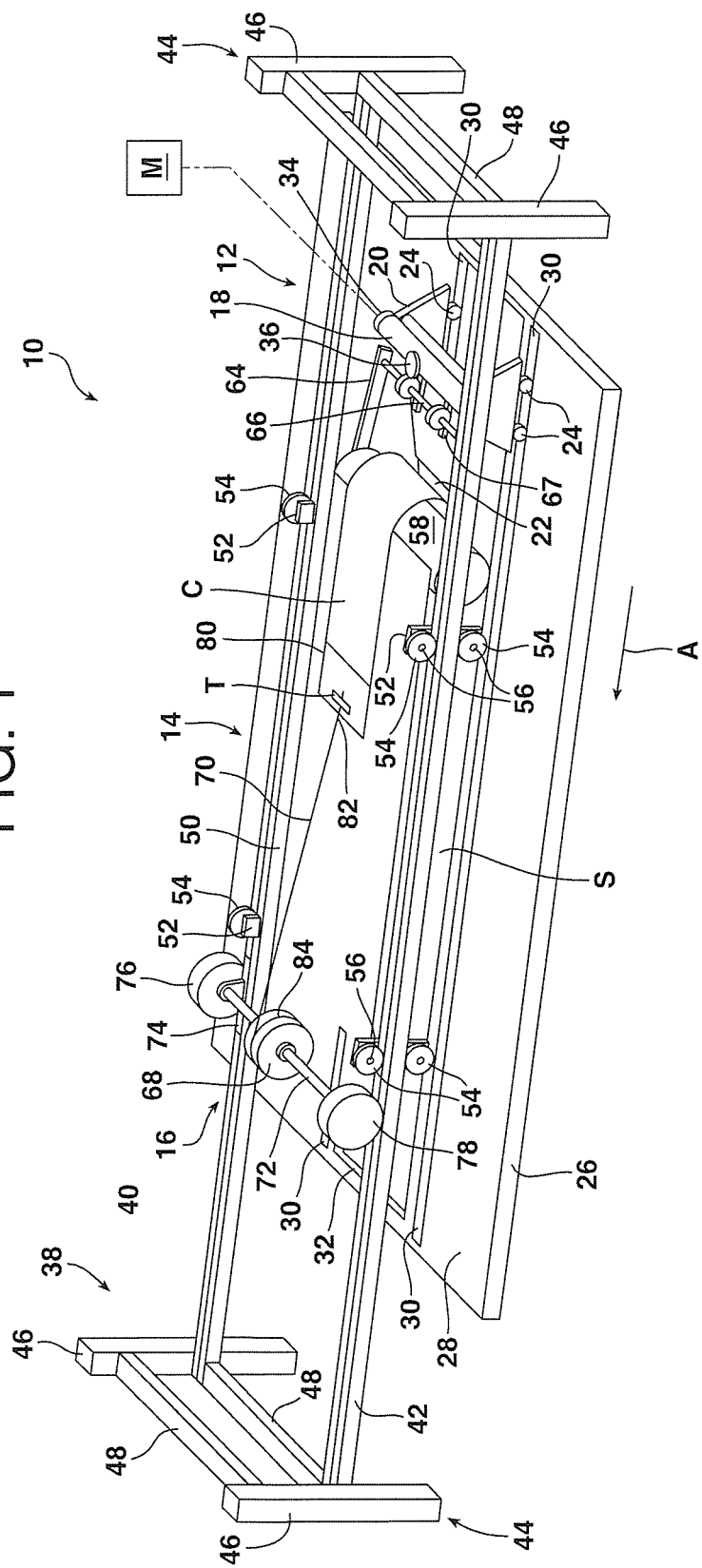
FIG. 1 is a perspective view of a first embodiment of the harvesting apparatus for carbon nanotube arrays.
Figure 2A:
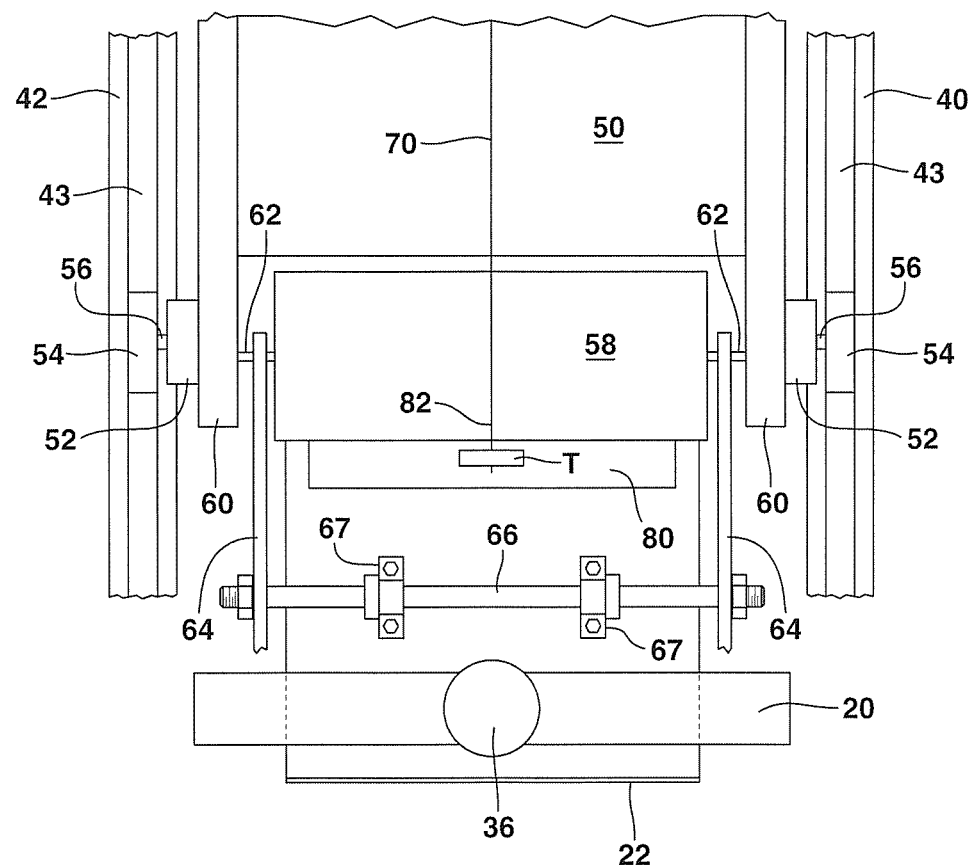
FIG. 2a is a detailed fragmentary and schematical top plan view of the guide drum end of the slide.
Figure 2B:
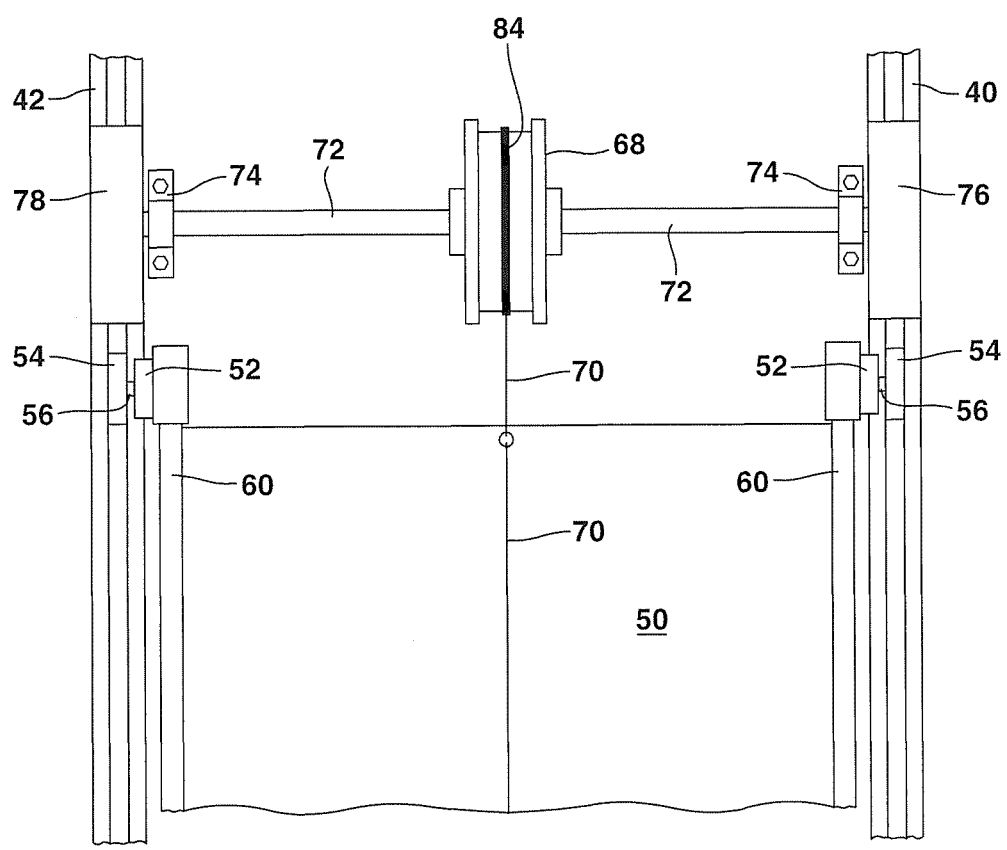
FIG. 2b is a detailed fragmentary and schematical view of the take-up reel end of the slide.

Reference is now made to FIGS. 1-3 illustrating an apparatus 10 for harvesting a carbon nanotube array C from a substrate S. The apparatus 10 may be broadly described as including a peeler 12 that peels the carbon nanotube array C from the substrate S, a support 14 that receives the carbon nanotube array peeled from the substrate and a drawing device 16 that simultaneously draws the carbon nanotube array from the substrate onto the support as the carbon nanotube array is peeled from the substrate. As illustrated, the peeler 12 includes a cutting sled 18 having a body 20 that holds a cutter or blade 22 at an acute cutting angle of between about 5 degrees and about 45 degrees and more typically between about 10 degrees and about 30 degrees. The body 20 of the cutting sled 18 is supported on two sets of rollers 24. In one possible embodiment the two sets of rollers 24 support the cutting sled 18 for movement along a base 26 having a support surface 28 including two guide channels 30 that receive the rollers. A jig 32 receives a substrate S including an attached carbon nanotube array C and holds that substrate in proper position on the base 26 for the harvesting operation.

As should be further appreciated, the peeler 12 includes knobs 34 for adjusting the acute cutting angle of the cutter or blade 22 relative to the substrate S and a knob 36 for locking the cutter/blade 22 within the body 20 of the cutting sled 18.

As best illustrated in FIGS. 1 and 2, the support 14 includes a guide track 38 having two parallel guide rails 40, 42. Each guide rail 40, 42 includes a continuous center groove 43. The guide rails 40, 42 are supported by frames 44 at each end. Each frame 44 includes two posts 46 and two cross beams 48. The support 14 also includes a slide 50. The slide 50 includes two side beams 60 and a mounting block 52 at each corner. Each mounting block 52 holds a pair of cooperating guide rollers 54 on stub shafts 56. The guide roller pairs 54 engage/sandwich the guide track 38 with two guide roller sets on one side of the slide 50 rolling along the guide rail 40 and two guide roller sets on the other side of the slide rolling along the guide rail 42. The top rollers 54 travel along the grooves 43 in the guide rails 40, 42.

The support 14 also includes a guide drum 58 mounted to the slide 50 by means of an axle or stub shaft 62 secured in opposing side beams 60 carried by the slide. Two connecting rods 64 are secured at a first end to the axle 62 with one connecting rod secured between the guide drum 58 and the two adjacent side beams 60. A cross member 66 is secured to the opposite ends of the connecting rods 64. A cooperating bracket and bearing assembly 67 secures the cross member 66 to the body 20 of the cutting sled 18. The connecting rods 64 ensure synchronized linear movement between the cutting sled 18 and the slide 50 rolling along the guide track 38. The bracket and bearing assembly 67 allows this interconnection to accommodate changes in the acute angle of the cutter or blade 22 made using the angle adjustment knob 34.

The drawing device 16 includes a take-up reel 68 and a draw line 70. The take-up reel 68 rotates with the shaft 72 mounted by means of brackets 74 to the slide 50. Rollers 76, 78 at the ends of the shaft 72 span the grooves 43 and roll along the respective guide rails 40, 42 during the harvesting operation. Significantly, (1) the connecting rods 64 between the cutting sled 18 and the slide 50 of the support 14 and the geometry of the rollers 76, 78 connected to the take-up reel 68 ensure that the peeler 12 and drawing device 16 are synchronized in movement so that as a length $L_1$ of carbon nanotube array C is peeled from the substrate S, a length $L_2$ of carbon nanotube array is drawn onto the support or slide 50 where $L_1=L_2$.

Operation of the harvesting apparatus 10 illustrated in FIGS. 1-3 will now be described in detail. A sheet of static film 80 is placed so as to overly and cling to the carbon nanotube array C on a substrate S. The static film 80 may be made from any polymer film or other material capable of holding a static charge. Such materials include polymer films such as fluoropolymer, polyolefins, PET, and PVDF. The substrate S is then positioned in the jig 32 on the base 26. The cutting sled 18 is then positioned so that the cutter or blade 22 rests against the upper surface of the substrate in position to cut or harvest the carbon nanotube array C cleanly from the substrate S. Next, a first end 82 of the drawline 70 is secured by tape T or other means to the end of the static film 80 adjacent the cutting sled 18. The second end 84 of the drawline 70 is wrapped around the take-up reel 68. Take-up reel 68 is advanced as necessary to take up any slack in the drawline 70 while the slide 50 is maintained in a static position.

Next, the cutting sled 18 is manually advanced or pushed in the direction of action arrow A (an optional linear actuator or motor M may be used). As the cutter blade 22 advances across the surface of the substrate S, the carbon nanotube array C is cut or peeled from the substrate S. Simultaneously, the connecting rods 64 connecting the cutting sled 18 to the support 14, and more particularly to the slide 50, cause the slide to move a corresponding linear distance along the guide track 38. Simultaneously and in synchronization, the rollers 76, 78 connected to the take-up reel 68 roll along the guide rails 40, 42 causing an equal linear distance of drawline 70 to be wound upon the take-up reel 68. As should be appreciated, the drawline 70 is taken up on the take-up reel 68 a linear amount or distance corresponding to the linear amount or distance moved by the cutting sled 18 and slide 50. Accordingly, the movement of the cutting sled 18, the slide 50 and the taking up of the drawline 70 are all in synchronization. Thus, initially the drawline 70 and then the harvested carbon nanotube array 60 are drawn up away from the cutting sled 18 over the guide drum 58 and onto the top of the slide 50 where the carbon nanotube array C rests flat under the static film 80 to which it is attracted. Together the synchronicity of the movement and the static force of the film 80 ensure harvesting of much larger sections of carbon nanotube array C than previously possible.

Reference is now made to FIG. 4 illustrating a second embodiment of harvesting apparatus 100. The harvesting apparatus 100 of the second embodiment includes an endless conveyor 102 comprising a seamless belt 104 made from reinforced polyurethane, reinforced rubber, metallic chain or other appropriate materials. The belt 104 has a support surface 106 upon which a carbon nanotube array C covered substrate S is positioned. The endless conveyor 102 includes drive drums 108, 110 at each end that ensure smooth and efficient movement of the endless conveyor belt 104 in the direction of action arrows B.

The harvesting apparatus 100 further includes a cutter/blade 112 attached to a cutting block 114. The cutter/blade 112 is designed to shave or peel the carbon nanotube array C away from the substrate S as the conveyor 102 is advanced in the direction of action arrow B.

As should be appreciated, the harvesting apparatus 100 further includes a static film supply roll 116 and a series of idler rollers 118. As each substrate S is advanced along the endless conveyor 102, static film 80 is paid out from the supply roll 116 and the idler rollers 118 position the film so as to overly and cling to the carbon nanotube array C held on the substrate S. The static charge of the film 80 functions to cause the film and carbon nanotube array to cling together. When the substrate S reaches the cutter/blade 112 and the carbon nanotube array C is peeled from the substrate, the carbon nanotube array C and the overlying static film 80, bound together by static attraction, are wound onto the winding drum 120. After initiating this process with a drawline in a manner such as described above with respect to the first embodiment, it should be appreciated that the carbon nanotube array harvesting process provided by the apparatus of the second embodiment is essentially continuous. One or more motors 122 drive the endless conveyor 102, the winding drum 120 and the film supply roll 116 in synchronization. As a result of the synchronization between the components and the attractive force of the static film 80 operating on the harvested carbon nanotube array C, carbon nanotube arrays of indefinite length in the form of films may be harvested with minimal difficulty.

The apparatus 10 or apparatus 100 may be utilized to harvest carbon nanotube arrays C formed by substantially any means including those presented in, for example, U.S. Pat. Nos. 7,160,531 and 7,504,078 to Jacques et al, the full disclosures of which are incorporated herein by reference. The carbon nanotube arrays C may incorporate carbon nanotubes having a diameter of between about 10 nanometers and about 1000 nanometers and a length of between about 5 microns and about 5000 microns. The arrays may have a density of between about 0.1 g/cc and about 2 g/cc. The harvested carbon nanotube arrays may or may not include any form of matrix binder to hold the carbon nanotubes together in alignment. Advantageously, the carbon nanotube arrays C harvested by means of the apparatus 10 or apparatus 100 may be of a width of between about 1 inch and about 24 inches and a length of between about 1 inch and about several feet. Significantly, the harvesting apparatus 10, 100 is not limiting in this regard, rather the production process is.

Reference is now made to FIG. 5 illustrating a flexible magnetic sheet 200. The flexible and magnetic sheet 200 is made from rare earth magnetic material in a flexible sheet form and, for example, is available from Electrodyne Company Inc. As described in U.S. Pat. No. 6,707,361 this flexible magnet material produces up to 5.0 MGOe. The magnetic sheet 200 may be used to enhance the handling of the harvested nanotube array C. More specifically, after harvesting the carbon nanotube array C is resting on the sheet of static film 80 on top of the slide 50. One may carefully slide the film 80, carrying the carbon nanotube array C, onto the flexible magnetic sheet 200.

The carbon nanotube array C includes some residual iron compounds from the production process. The flexible magnetic sheet 200 provides a magnetic force that attracts the carbon nanotube array C by means of those residual iron compounds. As a consequence, the carbon nanotube array C is held flat against the sheet 200 where it is protected and maintained as an integral film. Advantageously, the flexibility of the sheet 200 allows for easy manipulation and movement of the carbon nanotube array C while simultaneously maintaining array integrity. At the same time, the presence of the static film 80 between the carbon nanotube array C and the magnetic sheet while maintaining the array intact for subsequent use (i.e. one peels the static film 80 away from the magnetic sheet 200 and the carbon nanotube array C remains intact on the film 80).

In another approach, the magnetic sheet 200 is placed on top of the slide 50 before harvesting the array C from the substrate S. Thus, the static film 80 and array C are drawn over the guide drum 58 onto the top of the magnetic sheet 200 resting on the slide 40. In this approach, the slide 50 is made from plastic or other nonmagnetic material. Accordingly, the array C may be easily removed from the slide 50 by lifting the magnetic sheet 200. The magnetic attraction between the sheet 200 and the residual iron in the carbon nanotubes functions to maintain the integrity of the array C during handling. The static film 80 between the magnetic sheet 200 and array C allows one to subsequently remove the array C from the sheet 200 when desired.

The foregoing description of the preferred embodiments of the present invention have been presented for purposes of illustration and description. It is not intended to be exhaustive or to limit the invention to the precise form disclosed. Obvious modifications or variations are possible in light of the above teachings. For example, the apparatus 100 may include a wool felt strip 128 to induce a static charge on the film 80 where the film does not already include one. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims in their fair and broad interpretation in any way.

What is claimed:

1. An apparatus for harvesting a vertically aligned intact carbon nanotube array from a substrate, comprising:
    a peeler that peels said carbon nanotube array intact from said substrate, wherein said peeler comprises a cutting sled including a cutter positioned to cut the vertically aligned carbon nanotube array from the substrate;
    a support comprising a static film that receives said vertically aligned intact carbon nanotube array peeled from said substrate; and
    a drawing device that simultaneously draws said vertically aligned intact carbon nanotube array from said substrate onto said static film of said support as said vertically aligned carbon nanotube array is peeled from said substrate.

2. The apparatus of claim 1, wherein said peeler and said drawing device are synchronized so that as a length $L_1$ of vertically aligned intact carbon nanotube array is peeled from said substrate a length $L_2$ of vertically aligned intact carbon nanotube array is drawn onto said static film of said support where $L_1=L_2$.

3. The apparatus of claim 2, said support includes a guide track and said drawing device includes a take-up reel and a draw line having a first end and a second end, said first end being connected to said vertically aligned carbon nanotube array and said second end being connected to said take-up reel; and said cutting sled and said support being connected together and displaceable between a first position and a second position.

4. The array harvesting apparatus of claim 3, wherein said cutting sled includes a body supported for movement on at least two rollers, said body holding said cutter at an acute cutting angle of between about 5 and about 45 degrees.

5. The array harvesting apparatus of claim 4, wherein said acute cutting angle is between about 10 and about 30 degrees.

6. The array harvesting apparatus of claim 4, wherein a connecting rod connects said cutting sled to said support.

7. The array harvesting apparatus of claim 6, wherein said support includes a guide drum.

8. The array harvesting apparatus of claim 3, wherein said guide track comprises two parallel guide rails.

9. The array harvesting apparatus of claim 8, wherein said support includes at least four guide rollers engaging said guide track and rolling along said two parallel guide rails.

10. The array harvesting apparatus of claim 8, wherein said take-up reel is connected to a shaft that rotates in two brackets connecting said shaft to said support.

11. The array harvesting apparatus of claim 10, wherein said shaft includes a first roller and a second roller, said first roller rolling along a first rail of said two parallel guide rails and said second roller rolling along a second rail of said two parallel guide rails.

12. The array harvesting apparatus of claim 11, further including a drive motor for displacing said cutting sled and said support.

13. The array harvesting apparatus of claim 2, wherein the static film overlies and clings to said vertically aligned intact carbon nanotube array on said substrate, said first end of said draw line being connected to said static film.

14. The array harvesting apparatus of claim 2, wherein said support comprises a winding drum upon which said carbon nanotube array is wound as said vertically aligned carbon nanotube array is peeled from said substrate.

15. The array harvesting apparatus of claim 14, including (a) a continuous conveyor having a conveying surface, said substrate being supported on said conveying surface, and (b) said drawing device comprising a drive motor for said conveyor and said winding drum.

16. The array harvesting apparatus of claim 15, further including:

the static film overlying and clinging to said carbon nanotube array on said substrate; and a feeder for said static film;

said static film being wound onto said winding drum with said harvested carbon nanotube array.

* * * * *